(12) United States Patent
Tureaud et al.

(10) Patent No.: US 11,872,491 B2
(45) Date of Patent: *Jan. 16, 2024

(54) MIXED REALITY COMPETITIONS INVOLVING REAL AND VIRTUAL PARTICIPANTS

(71) Applicant: The Generational Project, LLC, Palm Beach Gardens, FL (US)

(72) Inventors: Christian B. Tureaud, Sherman Oaks, CA (US); James M. Fazio, West Palm Beach, FL (US)

(73) Assignee: The Generational Project, LLC, Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/941,494

(22) Filed: Sep. 9, 2022

(65) Prior Publication Data

US 2023/0001303 A1 Jan. 5, 2023

Related U.S. Application Data

(63) Continuation of application No. 17/136,916, filed on Dec. 29, 2020, now Pat. No. 11,471,774.

(Continued)

(51) Int. Cl.
*A63F 13/65* (2014.01)
*G06T 13/40* (2011.01)
(Continued)

(52) U.S. Cl.
CPC ............ *A63F 13/65* (2014.09); *A63F 13/812* (2014.09); *G06T 13/40* (2013.01); *G06T 19/006* (2013.01)

(58) Field of Classification Search
None
See application file for complete search history.

(56) References Cited

U.S. PATENT DOCUMENTS 9,616,328 B2 4/2017 Song et al.
10,409,363 B1 9/2019 Kudirka et al.
(Continued)

OTHER PUBLICATIONS

Maslakovic, Marko, "The Ghost Pacer: race against an augmented reality running partner", Aug. 21, 2020, https://gadgetsandwearables.com/2020/08/12/the-ghost-pacer/, 5 pages.

(Continued)

*Primary Examiner* — Jay Trent Liddle
(74) *Attorney, Agent, or Firm* — Lowenstein Sandler LLP

(57) ABSTRACT

A method and system to generate first participant data of a real participant, wherein the first participant data comprises at least one of a height, a weight, or performance data of the real participant. Second participant data of a virtual representation of a competitor is generated, the second participant data being based on historical performance data associated with one or more competitions involving the competitor. A comparison of the first participant data and the second participant data is generated. Based at least in part on a display of the comparison, a selection of the competitor from a set of competitors is identified. Based on the first participant data and the second participant data, a simulation of a competition involving the real participant and the virtual representation of the competition is generated and a winner of the simulation of the competition is identified.

20 Claims, 4 Drawing Sheets

Related U.S. Application Data

(60) Provisional application No. 63/011,044, filed on Apr. 16, 2020.

(51) Int. Cl.
 *A63F 13/812* (2014.01)
 *G06T 19/00* (2011.01)

(56) References Cited

U.S. PATENT DOCUMENTS

| | | |
|---|---|---|
| 10,525,324 B2 | 1/2020 | Kudirka et al. |
| 10,661,149 B2 | 5/2020 | Kudirka et al. |
| 2002/0049508 A1 | 4/2002 | Williams |
| 2011/0128300 A1 | 6/2011 | Gay et al. |
| 2018/0236335 A1 | 8/2018 | Loduca |
| 2018/0256962 A1 | 9/2018 | Kudirka et al. |
| 2018/0261010 A1 | 9/2018 | Kudirka et al. |
| 2019/0358547 A1 | 11/2019 | Mack et al. |

OTHER PUBLICATIONS

Soper, Taylor, "Running with Google Glass: This app lets you race against a ghost version of yourself", Aug. 23, 2013, https://www.geekwire.com/2013/running-google-glass-app-lets-race-ghost-version/, 2 pages.

"How AR and VR are Revolutionising The Car Industry", Jun. 26, 2020, https://www.fiaformulae.com/en/news/2020/june/ar-vr, 4 pages.

Joshi, Naveen, "Revolutionizing Sports With Augmented Reality", Forbes, Oct. 26, 2019, https://www.forbes.com/sites/cognitiveworld/2019/10/26/revolutionizing-sports-with-augmented-reality/?sh=1dde4fba1416, 7 pages.

Dalton, Andrew et al., James Dean revival spurs debate on raising the digital dead, AP News, Jan. 20, 2020, https://apnews.com/article/f9786493b3d029dc18be88025b51298c, 13 pages.

Hiroshi et al., "Mario Kart Live: Home Circuit", Wikipedia, Velan Studios, Nintendo, Mario Kart, Nintendo Switch, https://en.wikipedia.org/wiki/Mario_Kart_Live:_Home_Circuit, 5 pages, accessed on Jun. 28, 2022.

"Deepfakes", Wikipedia, https://en.wikipedia.org/wiki/Deepfakes, 14 pages, accessed on Jun. 28, 2022.

MIXED REALITY COMPETITIONS INVOLVING REAL AND VIRTUAL PARTICIPANTS

CROSS-REFERENCE RELATED APPLICATIONS

This application is a continuation application of U.S. patent application Ser. No. 17/136,916, filed on Dec. 29, 2020, which in turn claims the benefit of U.S. Provisional Patent Application No. 63/011,044, filed on Apr. 16, 2020. The entireties of U.S. patent application Ser. No. 17/136,916 and U.S. Provisional Patent Application No. 63/011,044 are hereby incorporated by reference herein.

TECHNICAL FIELD

This disclosure relates to the fields of computer simulations and computer graphics, in particular, to creating a mixed reality computer simulated competition involving real and virtual participants.

BACKGROUND

People have participated in sporting events for thousands of years and more recently computer technology has helped enhance these sporting events so they can be enjoyed by a larger audience. The computer technology enables the events to be recorded and broadcast so they can be viewed by people that were unable to attend the sporting events in person. Video games have further enhanced sporting events by enabling one or more users to become virtual competitors in a virtual sporting event at a time and location that is convenient for them. The video games often provide a virtual reality environment with photorealistic players that can be manipulated to compete against one another.

BRIEF DESCRIPTION OF THE DRAWINGS

The present disclosure is illustrated by way of example, and not by way of limitation, in the figures of the accompanying drawings.

These drawings may be better understood when observed in connection with the following detailed description.

DETAILED DESCRIPTION

Traditional sporting events involve real people competing against one another to determine which person is the better competitor. There are many situations that arise that make a competition between real people challenging or impossible. For example, one or more of the people may be injured, sick, deceased, traveling, or otherwise unavailable or the location of the competition (e.g., course, field, track, or court) may be unavailable. Hosting the competition in a purely virtual environment may address these problems but often loses the excitement derived by a user when participating in person.

The technology disclosed herein provides a method and system for generating a mixed reality computer simulation of a competition between real and virtual participants. The technology may provide a mixed reality environment that merges aspects of the real world with aspects of a virtual world to produce a new visualization. The real participant may be any human being that wants to compete in-person with a virtual participant. The virtual participant may include a deceased person, a living person, a famous person, a friend, other participant, or a combination thereof. The real participant may perform actions in the real world that are captured in video content. The technology may augment the video content to also include simulated actions of the virtual participant. The simulation of the virtual participant may be based on one or more people (e.g., actual person or substitute body double), computer models (e.g., graphical model, behavioral model, and kinematic model), or a combination thereof. The technology may also determine scores for the real and virtual participants and determine the winner of the competition.

Various aspects of the above referenced methods and systems are described in detail herein below by way of examples, rather than by way of limitation. Some of the examples provided below discuss a sporting competition that involves golf. In other examples, the competition may be a sporting competition that involves a different sport or may be a different competition such as a fitness competition, a scholastic competition, other competition, or a combination thereof.

Figure 1:
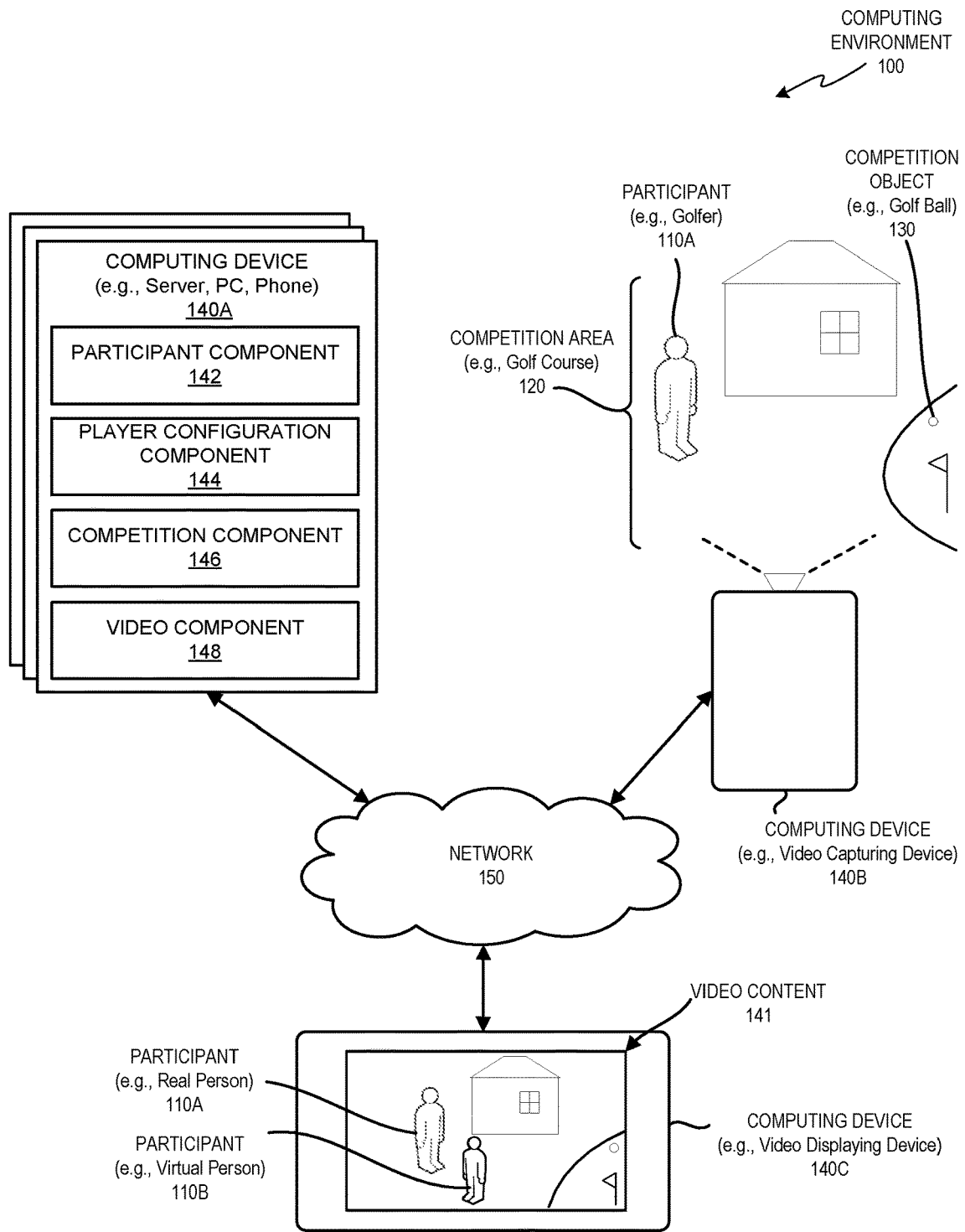
FIG. 1 illustrates an example computing environment for creating a mixed reality competition between real and virtual participants, in accordance with an implementation of the disclosure.

FIG. 1 illustrates an example computing environment 100 for creating a mixed reality computer simulated competition between real and virtual participants. In the example shown in FIG. 1, computing environment 100 may include one or more participants 110A-B, a competition area 120, a competition object 130, computing devices 140A-C, and a network 150.

Participants 110A-B may include any entities that can participate in a competition. Participants 110A-B may include living entities (e.g., biological organism) or non-living entities (e.g., mechanical devices) and may include one or more people (e.g., human beings), animals (e.g., horses, dogs), equipment (e.g., clubs, balls, cars, carts, chariots), other entity or object, or a combination thereof. Participants 110A-B may include real participants that are currently alive and tangible and virtual participants that are computer generated and intangible. A real participant (e.g., participant 110A) may be the same or similar to an actual participant, a real-life participant, a human participant, a real competitor, real player, or other term. A virtual participant (e.g., participant 110B) may be the same or similar to a computer generated participant, an avatar, a character, a figure, other virtual participant, or a combination thereof. In one example, both participants 110A-B may be based on a living organism but participant 110A may be based on a person that is currently alive and participant 110B may be based on a person that is deceased. The real participant and virtual participant may participate in the competition at the same time or at different times (e.g., time shifting).

The competition may involve one or more competitive events (e.g., games, matches, meets, rounds, holes) and involve one or more participants (e.g., players, competitors). The participants may participate individually or as part of a team and may compete together with one another or against one another. The competition may include a physical competition, an intellectual competition, or a combination thereof. The physical competition may involve performing physical activities (e.g., athletic activities, sporting activities) that involve the use of a set of muscles and physical strength (e.g., arm strength, leg strength). The intellectual competition may involve performing intellectual activities (e.g., scholastic or academic activities) that involve intellectual strength (e.g., problem solving, memory, pattern recognition). The intellectual competitions may involve board games (e.g., Chess, Go), academic subjects (e.g., math, history, spelling bee), puzzles, riddles, other intellectual competition, or a combination thereof.

Physical competitions may include one or more sporting competitions, fitness competitions, other competitions, or a combination thereof. A sporting competition may involve one or more sports and the sports may include golf, tennis, baseball, basketball, football, soccer, running, cycling, swimming, diving, surfing, rowing, sailing, automotive racing, horse racing, dog racing, gymnastics, dance, darts, bowling, shooting, equestrian, speed skating, skiing, snowboarding, other sport, or a combination thereof. A fitness competition may involve physical activity but may not be associated with a particular sport. The fitness competition may include cardio activity, weightlifting, climbing, push-ups, other fitness activity, or a combination thereof.

Competition area 120 may be an area where the competition occurs. Competition area 120 may be at one or more physical locations (e.g., geographic locations or area) or at virtual locations (e.g., virtual area). Competition area 120 may be the same or similar to a course (e.g., golf course), court (e.g., tennis court, basketball court), field (e.g., baseball field, soccer field, football field), rink (e.g., skating rink, hockey rink), track (e.g., automotive track, dirt bike track, horse track), trail (e.g., ski trail, hiking trail), alley (e.g., bowling alley), board game (e.g., chess board), other area, or a combination thereof.

Competition object 130 may be an object that is used before, during, or after the competition. The object may be movable or non-movable and may include equipment that enables or enhances the competition. In one example, competition object 130 may be a movable object (e.g., ball, puck, club, bat) and the participants may move it during the competition (e.g., hitting a golf ball with golf club, throwing a football, moving a game piece). In another example, competition object 130 may be a stationary object and the participants may interact with the competition object without moving the object (e.g., hole, tee box, sand trap, basketball hoop, goal post). In either example, competition object 130 may be a tangible object as discussed above or may be an intangible object. The intangible object may be a boundary line, goal line, start line, finish line, line of scrimmage, other object, or a combination thereof.

Computing devices 140A-C may include any computing devices that are capable of processing data. Computing devices 140A-C may include one or more server computers, personal computers (PCs), desktop computers, laptop computers, mobile phones, tablet computers, other computing devices, or a combination thereof. One or more of computing devices 140A-C may be associated with a cloud computing environment (e.g., cloud computer), an on-premise computing environment (e.g., data room, data center), edge computing environment (e.g., computer at location of participant), other computing environment, or a combination thereof. Computing devices 140A-C may include one or more sensor devices (e.g., sensors) that are capable of sensing and capturing information from a surrounding environment and storing it as data. The sensor devices may passively detect signals or may actively transmit a signal into the surroundings and sense a response to the transmitted signal. In some implementations, one or more of the computing devices 140A-C may be referred to as a "computer," "server device," "client device," "user device," other variation, or a combination thereof. In the example shown in FIG. 1, computing devices 140A-C may include computing device 140A (e.g., server), computing device 140B (e.g., video capturing device), and computing device 140C (e.g., video display device).

Computing device 140A may include multiple components and the components may be executed on a single computing device or on different computing devices. In one example, computing device 140A may include a participant component 142, a player configuration component 144, a competition component 146, and a video component 148. Participant component 142 may be used to analyze one or more participants to track or model their actions. Participant component 142 may analyze data associated with the participant to create one or more computer models (e.g., graphical model, kinetic model). The data may include image data (e.g., videos or still images), physiological data (e.g., height, weight), performance data (e.g., historical scores), other data, or a combination thereof. Player configuration component 144 may determine the configuration of a competition that involves one or more players. The configuration may involve determining (e.g., selecting, identifying, recommending) one or more participants, equipment, competition areas, or other aspect of a competition. Competition component 146 may be used to simulate a competition that may include at least one real participant and at least one virtual participant. Competition component 146 may track the progress of the real user and may simulate the progress of the virtual user. Video component 148 may be used to access video content that may include the real participant and to augment the video content to include one or more of the virtual participants. Components 142, 144, 146, and 148 are discussed in more detail below in regards to FIG. 2.

As shown in FIG. 1, computing devices 140B-C may be the same or similar to computing device 140A and may be used to capture or display video content 141. Computing device 140B may be configured to capture video content associated with the competition and may be referred to as a video capturing device, image capturing device, other device, or a combination thereof. Computing device 140B may function as a camera (e.g., video camera, still camera), a scanner (e.g., laser scanner), other data capturing device, or a combination thereof. Computing device 140C may be configured to display video content associated with the competition. Computing device 140C may be a video display device that is the same or similar to a Television (TV), Personal Computer (PC), phone (e.g., smart phone, mobile phone), head mounted display (e.g., smart glasses, Google Glass®, virtual reality headset, Oculus Rift®), set top box (e.g., Apple TV®, Roku®, Tivo®, cable box), other device, or a combination thereof. Computing device 140C may access video content 141 and include one or more displays (e.g., screens, monitors, projectors) that are configured to present video content 141 to one or more users (e.g., viewers, consumers, clients, end users).

Video content 141 may be associated with the competition and may include one or more aspects of the competition. Video content 141 may include one or more real participants 110A, virtual participants 110B, special effects (e.g., visual and/or audio), portions of competition area 120, other aspect of a competition, or a combination thereof. Video content 141 may include image content (e.g., people, background, scenery), audio content (e.g., music, voices, sound effects), textual content (e.g., scores, participant statistics, rankings), other content, or a combination thereof. The image content may include pixel values or vectors that represent two-dimensional (2D) or three-dimensional (3D) graphics. The graphics may be used to represent dynamic images (e.g., animations, motion pictures) or static images (e.g., still images, photographs). Video content 141 may be formatted in a video encoding format (e.g., video container format) such as MPEG (e.g., MP4), H.xxx (H.264/AVC, H.265/HEVC) or other format. Video content 141 may be stored as one or more data structures that may include file objects (e.g., file, directory), database objects (e.g., record, table), or other data storage objects. In one example, video content 141 may include content for videos (e.g., television programs, films, commercials), simulators (e.g., sports simulator), video games (e.g., golf video game), other product or service, or a combination thereof.

Network 150 may include a public network (e.g., the Internet), a private network (e.g., a local area network (LAN), wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Figure 2:
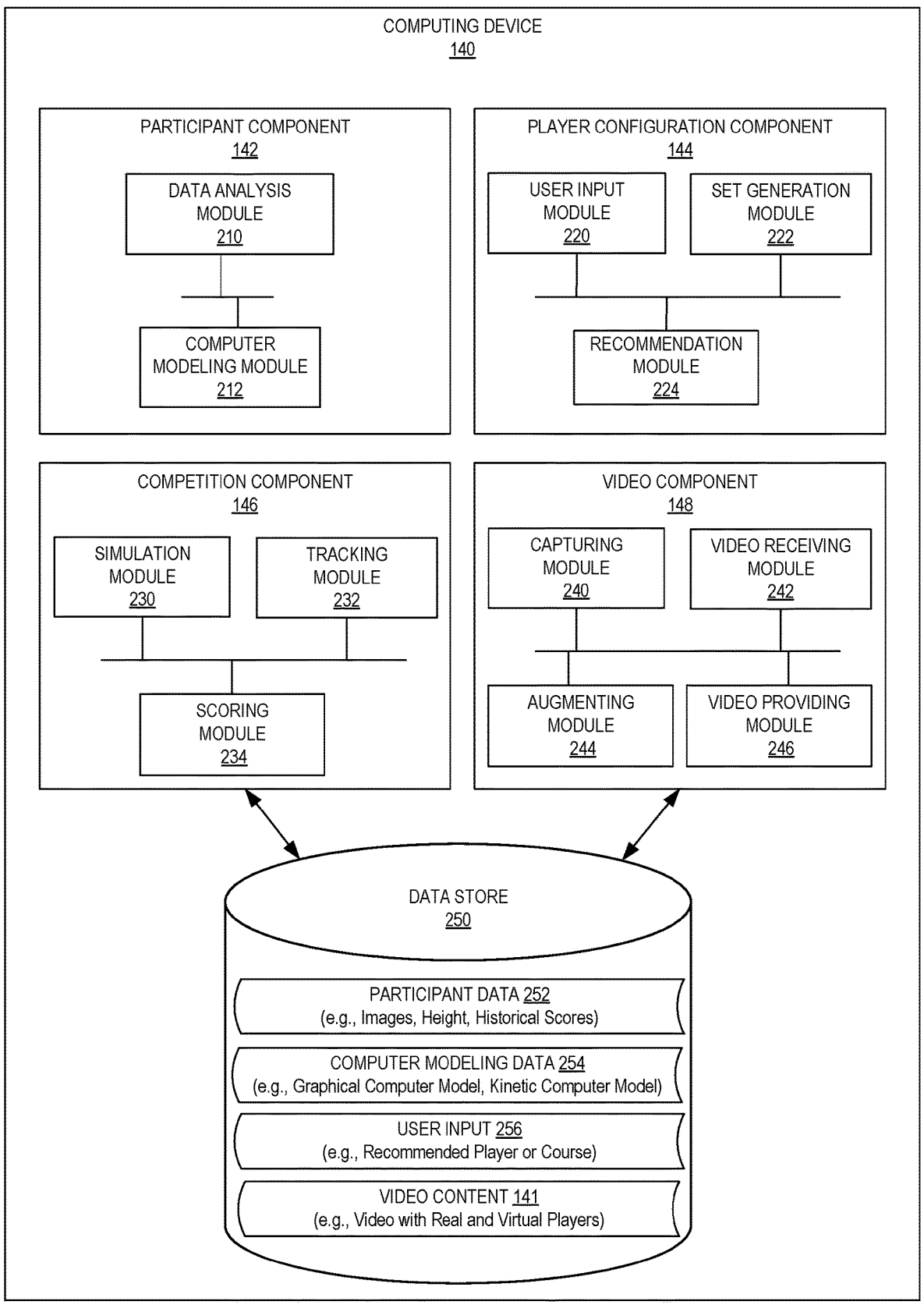
FIG. 2 is a block diagram illustrating example components and modules of a computing device, in accordance with an implementation of the disclosure.

FIG. 2 a depicts a block diagram illustrating an exemplary computing device 140 that implements technology for enabling a mixed reality simulated competition between real and virtual participants, in accordance with one or more aspects of the present disclosure. Computing device 140 may be the same or similar to one or more of the computing devices 140A-C of FIG. 1. As shown in FIG. 2, computing device 140 may include a participant component 142, a player configuration component 144, a competition component 146, and a video component 148. More or less components or modules may be included without loss of generality. For example, two or more of the components may be combined into a single component or a component may be divided into two or more components. In one implementation, one or more features of a component or module may spread across different computing devices (e.g., on a server device and client device).

Participant component 142 may enable computing device 140 to analyze, generate, update, or aggregate data for one or more participants. In one example, participant component 142 may include a data analysis module 210 and a computer modeling module 212.

Data analysis module 210 may access and analyze participant data 252 that is associated with a real participant, a virtual participant, or a competition and may include different types of data from one or more different data sources. The data sources may include sensor devices that sense an aspect of a user or an environment and generate data (e.g., video camera, accelerometer, thermometer, barometer, hygrometer, heart rate sensor), user applications that enable users to input the data (e.g., user inputs, user selections), a third party sources that provide data (e.g., database with player statistics), other data source, or a combination thereof. In one example, data analysis module 210 may receive data for a participant from a computing device comprising one or more sensors (e.g., mobile phone, watch, ear buds, or smart glasses).

The data received from the data source may be stored as or transformed into different types of data. The types of data may include physiological data, performance data, environment data, image data, other data, or a combination thereof. The physiological data may indicate measurements or descriptions of a biological organism and may include weights (e.g., weight of a person), heights (e.g., height of a person), lengths (e.g., length of an arm, leg, gait), age, gender, ethnicity, strength, fitness, form, endurance, other data, or a combination thereof. The performance data may indicate measurements or descriptions of a participant's actions and may include past scores (e.g., score in a prior competition), speeds (e.g., swing speed, running speed, throwing speed), power (e.g., club driving distance, throwing distance), experience (e.g., 20 years, 1000 person-hours), equipment being used (e.g., club specifications, footwear, gloves, apparel), skill, accuracy, consistency, other performance data, or a combination thereof. The environment data may include temperature data (e.g., temperature measurements), humidity data (e.g., humidity measurements), barometric data (e.g., elevation measurements), weather condition data (e.g., raining, snowing, lightening), other data, or a combination thereof. The image data may include one or more still images or videos that are related to the participant. The videos may capture the likeness of the participant and one or more physiological or performance aspects of the participant. The data accessed by data analysis module 210 may be updated, transformed, formatted, compressed, filtered, aggregated, or enriched before, during or after being stored as participant data 252 in data store 250 (e.g., persistent or non-persistent data storage).

Computer modeling module 212 may access participant data 252 and generate one or more computer models. A computer model may correspond to one or more virtual participants, real participants, competition areas, competitions, other entity, or a combination thereof. The computer models may be used to simulate, predict, recommend, monitor, interpret, render, animate, or represent an aspect of a participant or competition. The aspect may relate to an appearance, an action, a result, a score, other aspect, or a combination thereof. The computer model may be the same or similar to a mathematical model, a statistical model, probabilistic model, a deterministic model, a numeric model, a 3D model, other representation, or a combination thereof. As discussed in more detail below, the computer models may be used to simulate virtual participants, track real participants, augment video content, make recommendations, perform other functions, or a combination thereof.

A computer model may include a data structure that stores mapping data that maps a set of one or more input parameters to an output parameter (e.g., a participant action or image). The mapping data may be in the form of one or more tables, indexes, if-else statements, other data or a combination thereof. The mapping data may also or alternatively be in the form of mathematical data (e.g., weights, biases, equations, variables, coefficients, constants). In one example, the computer model may be used to map input data (e.g., distance to hole, presence of obstructions, roughness of competition area) to output data (e.g., medium swing with a seven iron, sand wedge, putter, or driver). In another example, the computer model may be used to map input data (e.g., image of an actor) to output data (e.g., image augmented to appear like deceased legend).

The computer models may be generated and/or stored by computing device 140 in data store 250 as computer modeling data 254. Computer modeling data 254 may be generated with or without the assistance of a human and may include numeric data that is generated by computing device 140 or may be generated by another computing device and transmitted to computing device 140. Generating a computer model may involve computer generated imagery (CGI), machine learning (ML), other technology, or a combination thereof.

Computing device 140 may generate computer modeling data 254 by creating a new model, updating an existing model, or combining different models. In one example, a first model may be selected and updated to generate a second model that more closely represents a particular participant (e.g., the deceased person). The first model may be referred to as a base model, a generic model, a template model, or other term and may be selected by a human or computing device based on participant data 252 (e.g., whether human/animal, male/female, etc). Computing device 140 may update the first model based on participant data 252, which may include image data of the participant (e.g., videos of the deceased person before passing away). The generated computer modeling data may include a graphical computer model, a behavioral model, a kinetic computer model, other model, or a combination thereof.

The graphical computer model may be used to graphically represent an aspect of a participant or competition. The graphical computer model may be a multi-dimensional model (e.g., 3D Model or 2D Model) and may include numeric data that indicates an appearance of an object. The graphical computer model may enable a computing device to render a digital representation of the object and the digital representation may be incorporated into an image and displayed on a display device (e.g., playing a video). The digital representation may be a photorealistic digital representation of a participant (e.g., deceased person), a competition object (e.g., golf ball or golf club), a competition area (e.g., golf green or tee box), other aspect of a competition, or a combination thereof.

Using the graphical computer model to generate a virtual participant may involve generating a digital representation of a person (e.g., human being). The person may be a living person or a deceased person and may be referred to as a "Digital Legend®." In one example, the graphical computer model may be generated by analyzing image data of the participant (e.g., video data or still image data). In another example, the graphical computer model may be generated by analyzing image data of a substitute participant. The substitute participant may be an entity (e.g., person, animal, or object) that has an appearance that is similar to the appearance of the participant being modeled (e.g., body double). In yet another example, the graphical computer model may be generated based on both image data of the participant (e.g., video of deceased person) and image data of a substitute participant (e.g., video of a body double).

The behavioral computer model may represent the behavior of a participant and may be used to predict actions or select actions of the participant. Behavioral computer model may be the same or similar to a graphical computer model and may be generated based on data associated with a specific participant (e.g., participant data of a deceased person) or data associated with a general type of participant (e.g., general human behavior). In one example, the behavioral computer model may model the behavior of a deceased professional golfer and may be used to indicate the type of golf clubs selected, the swing of the user, other actions or emotions, or a combination thereof.

The kinetic computer model may be used to determine an action or a result of an action of a participant, competition object, competition area, or other aspect of a competition. The result of the action may be another action (e.g., reaction) or the end result of the action (e.g., trajectory or final location of competition object). The kinetic computer model may include numeric data that indicates the motion and interactions of one or more objects. The objects may include portions of a participant, equipment, competition object, competition area, other object, or a combination thereof. The kinetic computer model may be used to determine, recommend, select, or predict an action or a result of an action of a participant. In one example, the generation of the kinetic computing model is based on participant data of a deceased person that includes physiological data having one or more length measurements (e.g., height, arm length) and weights (e.g., body weight) and includes performance data having one or more scores of at least one historical competition involving the deceased person.

Player configuration component 144 may enable computing device 140 to determine a configuration for a competition involving a real participant (e.g., real player), a virtual participant (e.g., virtual player), or a combination thereof. The determination may involve selecting, recommending, or identifying an aspect of the competition with or without user input from a user. Player configuration component 144 may execute on computing device 140 and may involve determining one or more participants (e.g., virtual or real participants), competition areas (e.g., courses, tracks, courts), equipment (e.g., clubs, balls, apparel), environment (e.g., temperature, precipitation), or other aspect of a competition. In the example shown in FIG. 2, player configuration component 144 may include a user input module 220, a set generation module 222, and a recommendation module 224.

User input module 220 may enable the computing device 140 to receive input from a user of the technology (e.g., user of app or service). The user may provide user input 256 that enables computing device 140 to identify one or more participants, equipment, competition areas, or other aspect of a competition. User input 256 may be provided by the user interacting with a computer program that includes a user interface. The user interface may be based on or include a graphical user interface (GUI), command line interface (CLI), application programing interface (API), other interface, or a combination thereof. The computer program may be or include a user application such as a smart phone application (e.g., mobile app), a personal computer application (e.g., internet browser, vendor application), a server based application (e.g., web application), other product or service, or a combination thereof.

The user of the technology may be the same or different from the participant involved in the competition. In one example, the user of the technology (e.g., app user) and the real participant may be the same person and the virtual participant may be a different person (e.g., living or deceased professional athlete). In another example, the real participant involved in the competition may be different from the user of the technology and the user of the technology may be a friend, relative, colleague, employee, consultant, spectator, or competitor of the user.

Set generation module 222 may enable computing device 140 to generate a set of one or more options for a competition. The set of options may include one or more participants, competition objects, competition areas, other aspect of the competition, or a combination thereof. In one example, the set options may include a set of participants with one or more virtual participants, real participants, or a combination thereof. The participants in the set may include one or more deceased entities (e.g., deceased person or animal), living entities (e.g., person that is alive), fictional entities (e.g., character in a movie, book, or fable), famous entities (e.g., professional athlete, celebrity), entities associated with the user (e.g., relative, friend, colleague, pet, car), alternate versions of a participant (e.g., historical, future, or current version of the user or real participant), other entity, or a combination thereof. In one example, selecting an option from the set may involve computing device 140 providing one or more options in the set to the user and receiving user input 256 that identifies at least one of the participants. In another example, computing device 140 may automatically select one or more of the options in the absence of a user selection. This may involve selecting one or more of the options based on scores (e.g., highest score, scores above a threshold) or randomly selecting one of the options. In one example, one or more of the options of the set may be determined by recommendation module 224 (e.g., recommended options).

Recommendation module 224 may enable computing device 140 to generate a recommendation that includes one or more options for the competition. The recommendation may include one or more participants (e.g., virtual participant), competition objects (e.g., clubs, balls, footwear, or other equipment items), competition areas (e.g., best golf courses), other options for a competition, or a combination thereof. A recommended option may be automatically selected by computing device 140 or may be provided to the user and the user may provide user input (e.g., user selection) that identifies one or more of the recommended options before, during, or after the competition begins. Recommendation module 224 may generate a recommendation in view of an analysis or comparison of participant data 252, computer modeling data 254, user input 256, video content 141, or a combination thereof.

Recommendation module 224 may recommend a particular participant based on one or more of the participants involved in the competition. For example, recommendation module 224 may recommend a particular virtual participant based on a real participant selected for the competition. This may be advantageous because the competition may be more entertaining or enjoyable to a participant or viewer when the virtual participant and the real participant are more similar (e.g., a closer match). Determining the similarity may involve the recommendation module 224 generating a similarity value in view of data of the real participant and data of one or more candidate virtual participants. In one example, the similarity value may be based on one or more comparisons between the physiological data (e.g., participant's age, height, gender, or swing), performance data (e.g., past scores, experience, skill), or other data of the real participant and the candidate virtual participants. In one example, the similarity value may be lower when the data of different participants is less aligned (e.g., more differences) and may be higher when data of different participants are more aligned (e.g., more similarities).

Recommendation module 224 may recommend a particular competition area based on one or more of the participants involved in the competition. For example, recommendation module 224 may recommend, based on the real or virtual participants, a particular competition area or event (e.g., Pebble Beach, Madison Square Garden (MSG), Kentucky Derby, Daytona 500). This may be advantageous because the competition may be more entertaining or enjoyable to a participant or viewer depending on the competition area that is involved. Recommending a particular competition area may involve determining advantage data that indicates a competitive advantage of a first participant (e.g., real person) over a second participant (e.g., virtual or real person).

The advantage data may be based on comparisons between the performance data (e.g., past scores, experience, skill), physiological data (e.g., participant's age, height, gender, or swing), or other data of the participants. In one example, the advantage data may indicate the first participant has an advantage over the second participant in a first event of the competition (e.g., short distance shots/putting) and a disadvantage over the second participant in a second event of the competition (e.g., long distance shots/driving). Recommendation module 224 may compare the advantage data with data of one or more candidate competition areas to determine a competition area that provides a competitive advantage to the first or second participant (e.g., select golf course with more challenging putting to align with the first participant's better putting skills).

The competition may have multiple participants as discussed above or may include a single participant and during the competitive activity all other participants may be absent (e.g., without, missing, free of another competitor). In one example, a competition with a single real participant and no other real or virtual participants may occur when the real participant wants to compete in a time-shifted manner with themselves or another participant. In another example, a competition with a single real participant and no other real or virtual participants may occur when the real participant wants to have their activity (e.g., sequence of actions) analyzed by the technology without competing directly against another competitor. This may be used for training, practicing, entertainment, other purpose, or a combination thereof and may or may not involve the scoring discussed below.

Competition component 146 may enable computing device 140 to simulate a competition involving one or more virtual participants, real participants, or a combination thereof. In one example, the competition may be between a real participant and a virtual participant and the real participant may compete directly against the virtual participant (e.g., head-to-head competition). In another example, one or more real and/or virtual participants may compete together on the same team (e.g., team mates) and compete with one another against another team that includes one or more real or virtual participants. In either example, competition component 146 may simulate the actions of the virtual participants and may track or predict the actions of the real participants. Analysis of the actions may be used to calculate scores for one or more of the participants and to determine a winner. In the example shown in FIG. 2, competition component 146 may include a simulation module 230, a tracking module 232, and a scoring module 234.

Simulation module 230 may simulate the competition by simulating activity of a virtual participant, a competition object, a competition area, or a combination thereof. The simulation may involve simulating activities or results of the activities. The activities may be referred to as a competitive activities and may be related to a sports activity, fitness activity, academic activity, scholastic activity, or other activity. The activity may include a sequence of one or more actions and the actions in the sequence may be dependent or independent of prior actions. In one example, all the actions of a virtual participant that occur during a competition may be performed independent of another participant. In another example, one or more actions of a virtual participant may depend on prior actions of another participant (e.g., depend on a result of an action of the real participant). Simulation module 230 may select an action based on one or more past actions, current actions, or expected future actions of the participant being simulated, another participant (e.g., real or virtual person), competition object or area, or a combination thereof.

An action may include a particular motion of a participant, competition object, competition area, or a combination thereof. The actions of a virtual participant may involve a motion of the entire participant or a portion of the participant (e.g., arms, legs, body, head, hands, fingers, feet) and may involve locomotion (e.g., walking, running, sprinting, jumping, galloping, driving, flying), a swinging motion (e.g., swinging a club, bat, or racket), a throwing motion (e.g., throwing a ball), other motion, or a combination thereof. The actions of the competition object may modify the competition object and may involve impacting, projecting, transporting, or other modification to the competition object or area. The modification may alter the position, orientation, or location of the competition object with respect to the participant or competition area (e.g., moving from a first geographic location to a second geographic location). The actions of the competition area may involve changes that are the result of the participant or competition object and may deform or otherwise modify the competition area (e.g., ball rolling through sand trap).

Simulation module 230 may select an action or a result of the action based on one or more computer generated models (e.g., computer modeling data 254). As discussed above, there may be kinetic computer models, behavioral computer models, graphical computer models, other models, or a combination thereof. Simulation module 230 may use a kinetic computer model to simulate the physical effects of an action. The physical effects may be based on a calculation, such as calculating the distance a competition object will travel when impacted (e.g., where golf ball will land). Simulation module 230 may use a graphical computer model to simulate the visual effects of the action. Simulating the visual effects may involve generating a sequence of photorealistic images of the virtual participant performing the action and the results of the action on the competition object (e.g., video of virtual golfer hitting a golf ball with a golf club).

Tracking module 232 may enable computing device 140 to determine the progress of a participant during or after the competition. Tracking module 232 may be used to track one or more real participants, virtual participants, or a combination thereof. Tracking module 232 may track the progress by determining the actions of a real participant or the results of the actions. Determining the actions of the real participant may involve receiving input data indicating one or more actions of the real participant (e.g., activity of real person). In one example, the input data may include numeric data (e.g., scores, distances, swings, hits, throws) and may be received from the user via a user interface (as discussed above) or may be received from another service or device. In another example, the input data may include sensor data of a device that monitors the real participant before, during, or after an action. The sensor data may include GPS data, accelerometer data, audio data, image data, or other data. The sensor data may be provided by a sensor of computing device 140 or by another device (e.g., smart watch, mobile phone, security camera).

Scoring module 234 may enable computing device 140 to calculate one or more scores. The scores may include numeric values, alphanumeric values, character values, other values, or a combination thereof. Each score may be associated with one or more participants and each participant may be associated with one or more scores. In one example, a competition may include one or more competition events (e.g., holes, matches, meets, games) and each competition event may be associated with one or more scores. Scoring module 234 may perform one or more mathematical operation to calculate the one or more scores. The mathematical operations may involve adding, subtracting, averaging, multiplying, dividing, other operation, or a combination thereof.

Scoring module 234 may determine a winner based on the one or more scores. The winner may include one or more participants and may be an individual winner (e.g., winning participant) or a group of winning participants (e.g., winning team). The winner may be the winner of one or more of the competition events (e.g., first hole, first nine holes, all eighteen holes), a specific competition (e.g., first game or round), a series of competitions (e.g., tournament, professional golf tour), or a combination thereof. Determining the winner may involve computing device 140 performing one or more comparisons of one or more scores and selecting, identifying, sorting, filtering, arranging, or organizing, one or more of the scores or participants based on the comparisons. In one example, scoring module 234 may determine a first score for the virtual participant (e.g., deceased golfer) and a second score for the real participant (e.g., living golfer) and compare the first and second scores in view of one or more handicap score modifiers.

A handicap score modifier may include one or more numerical measures that are based on a particular participant (e.g., golfer), competition object (e.g., ball or club), competition area (e.g., golf course), other aspect of a competition, or a combination thereof. The handicap score modifier of a participant may enable participants with different abilities to compete more closely with one another. In one example, participants that are better competitors may have lower handicap score modifiers and participants that are worse competitors may have higher handicaps. A score may be referred to as a gross score before accounting for the handicap score modifier and referred to as a net score after accounting for the handicap score modifier.

The handicap score modifier may be the same or similar to a golf handicap. In one example, accounting for the golf handicap may involve subtracting the handicap score modifier from the total number of strokes (e.g., gross score) to produce a modified score (e.g., net score), which is then used to determine the final score. In another example, accounting for the golf handicap may involve applying the handicap score modifier to predetermined event scores (e.g., hole ratings, stroke index) and a portion deducted accordingly from each event score before calculating the total score for the event (e.g., total points for a hole). In yet another example, accounting for a golf handicap may involve determining a difference between handicap score modifiers of different participants and using the difference to determine the number of strokes the higher handicapped participant should receive from the low handicapped participant. In other examples, the handicap score modifier may be used to reduce the gross score by a set percentage in order to maintain a closer matched competition.

After determining the winner, computing device 140 may use scoring module 234 to indicate the winner to one or more users or user devices. Computing device 140 may indicate the winner by providing data that indicates the winning participant(s), the winning score(s), or a combination thereof. The data being provided may be referred to as winning data and may be displayed on a device, transmitted to another device, or may be incorporated into video content 141 using video component 148.

Video component 148 may enable computing device 140 to access and modify video content of the competition. In one example, video component 148 may include a capturing module 240, a video receiving module 242, an augmenting module 244, and a video providing module 246. As discussed above, these modules may be on the same computing device or on different devices. For example, the capturing module 240 may be associated with a first device (e.g., video camera) and the modules 242, 244, and 246 may be associated with one or more second devices (e.g., servers) that update video content 141 and share it with one or more user devices (e.g., video display device, TV, PC, mobile phone).

Capturing module 240 may enable a computing device to capture and store video content 141. Capturing module 240 may access sensor data of a photodetector and transform the sensor data into video content 141. Transforming the sensor data may include image processing that involves one or more of noise reduction, color balance, image stabilization, cropping, formatting, other data modification, or a combination thereof. Capturing module 240 may store video content 141 in a computer readable storage medium that includes electronic digital storage (e.g., main memory, disk, flash memory), analog storage (e.g., film, magnetic tape), or a combination thereof.

Video receiving module 242 may enable computing device 140 to receive video content 141. Receiving video content 141 may involve receiving video content 141 from a local data store, a remote data store, or a combination thereof. The local data store may be a data storage device that is integrated within computing device 140 (e.g., internal storage) or directly attached to computing device 140 (e.g., external storage). The remote data store may be a data storage device that is local to another computing device and may be accessible over a network or other computer connection. In one example, the received video content 141 may be referred to as video footage (e.g., raw video, un-augmented video) because it may include a portion of a competition area and one or more real participants but may be absent any virtual participants.

Augmenting module 244 may enable computing device 140 to augment video content 141 to include or modify one or more virtual participants, real participants, competition objects, competition areas, other aspect of a competition, or a combination thereof. Augmenting video content 141 may involve adding video content, removing video content, or modifying video content and may involve updating image data (e.g., pixel values) or metadata (e.g., text values, file names, caption data). Augmenting video content 141 may involve executing one or more operations (e.g., augmenting operations). The operations may include digital image processing operations that add (e.g., superimpose, overlay, supplement, enrich), remove (e.g., delete, negate, eliminate, take out), change (e.g., manipulate, alter, adjust, revise, enhance, degrade), or otherwise modify one or more frames of video content 141. In one example, augmenting module 244 may augment video content 141 by replacing image data of video content 141 with different image data (e.g., replacing a portion of competition area with a virtual participant). In another example, augmenting module 244 may generate a separate image layer that includes new image data and the image layer may be presented over the video content 141 (e.g., overlaid, superimposed) or may be integrated with the video content 141 (e.g., video content that includes one or more layers). The image layer may include content that is opaque, translucent, transparent, or a combination thereof.

Video content 141 may be augmented to graphically represent one or more actions or results of the actions. The actions are discussed above in more details and may be graphically represented as a change of state. A state may be based on a location, position, or orientation of a participant, competition object, competition area, other aspect of the competition, or a combination thereof. Each state or the change in state (e.g., state delta, image delta) may be rendered based on computer modeling data 254 (e.g., a graphical computer model, behavioral computer model, or kinetic computer model), participant data 252, user input 256, or a combination thereof.

Augmenting video content 141 to include a virtual participant may be performed using different techniques that may or may not involve the use of a substitute participant (e.g., actor, body double, or other real participant). When video content 141 includes a substitute participant, the augmenting module 244 may detect the substitute participant and may update the appearance of the substitute participant in the video content to represent the virtual participant (e.g., deceased participant). Detecting the substitute participant may involve performing image classification (e.g., detect frames with a person), image segmentation (e.g., detect pixels corresponding to a person), object detection (e.g., face detection or facial recognition), other image processing task, or a combination thereof. Modifying the appearance of the substitute participant may involve using image editing tools that alter features of the substitute participant (e.g., face, body, clothing, equipment) to appear as the virtual participant. Augmenting module 244 may also or alternatively augment the video content to include the virtual participant in the absence of a substitute participant. This may involve augmenting module 244 adding a computer generated graphical representation of the virtual participant into video content 141. The graphical representation may be a photorealistic graphical representation that is the same or similar to an avatar (e.g., photorealistic avatar of deceased person).

Augmenting module 244 may generate the graphical representation or modify the appearance of the substitute participant using image editing tools. The image editing tools may use human intervention, machine learning, or a combination thereof. Machine learning (ML) may be an example of artificial intelligence (AI) and may generate and use computer modeling data 254. Machine learning may enable a computing device to train one or more artificial neural networks (ANNs) and to use the one or more neural networks to generate and/or modify image data in the absence of human intervention (e.g., free of user selections or user input). The neural networks may be deep neural networks (DNNs) that have a neural network architecture that is the same or similar to a convolutional neural network (CNN), autoencoder, generative adversarial network (GAN), other architecture, or a combination thereof. In one example, the machine learning technique may be the same or similar to deep fake technology. The term "deep fake" or "deepfake" is a portmanteau of "deep learning" and "fake" and may involve generating synthetic media (e.g., image and/or audio) in which a person in existing media is replaced with the likeness of a different person.

Video providing module 246 may enable computing device 140 to provide video content 141 before, during, or after it is augmented by augmenting module 244. Providing the video content 141 may involve computing device 140 displaying video content, transmitting video content, storing video content, configuring video content, or making the video content available to be presented to one or more users. In one example, providing video content may involve video providing module 246 presenting (e.g., displaying, playing) the video content on a display of computing device 140. In another example, providing video content may involve transmitting the video content to a video display device (e.g., TV, PC, mobile phone). The transmission of the video content may be over a computer network (e.g., internet, wide area network (WAN), local area network (LAN)), a broadcast medium (e.g., cable, satellite, radio), a cellular network (e.g., radio access network (RAN)), communication channel (e.g., peer-to-peer connection), other transmission medium, or a combination thereof. In another example, providing video content may involve storing the video content on a shared storage device and configuring the video content to be accessible by one or more video display device (e.g., using a content distribution network, flash drive, CD, DVD).

Figure 3:
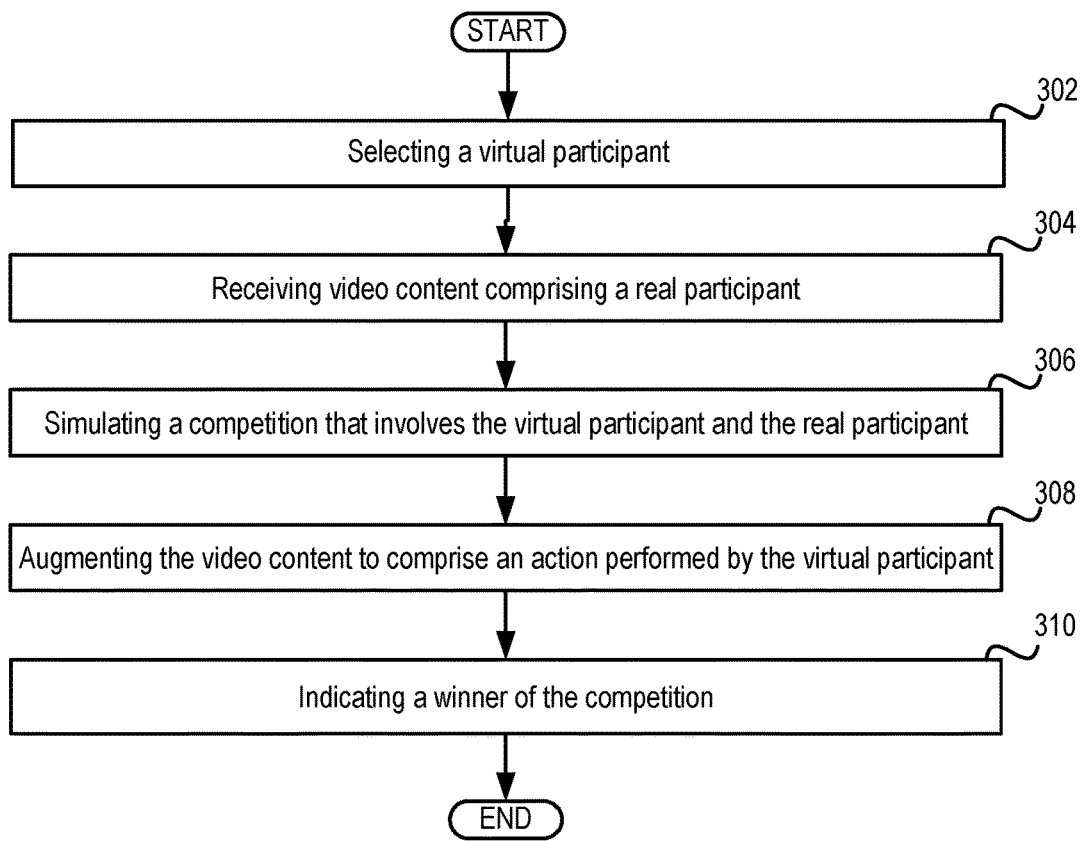
FIG. 3 is a flow diagram illustrating an example method in accordance with an implementation of the disclosure.

FIG. 3 depicts a flow diagram of one illustrative example of a method 300 for creating a mixed reality computer simulated competition involving real and virtual participants, in accordance with one or more aspects of the present disclosure. Method 300 and each of its individual functions, routines, subroutines, or operations may be performed by one or more processors of the computer device executing the method. In certain implementations, method 300 may be performed by a single computing device. Alternatively, methods 300 may be performed by two or more computing devices, each computing device executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one example, method 300 may be performed by one or more components 142, 144, 146, and 148 as shown in FIGS. 1 and 2.

Method 300 may be performed by processing devices of a server device or a client device and may begin at block 302. At block 302, a processing device may select a virtual participant. Selecting the virtual participant may involve the processing device (e.g., computing device 140) recommending a virtual participant of a set of virtual participants. The set of virtual participants may be based on or include one or more of a deceased person, a living person, a fictional person, a famous person, an acquaintance of the real participant, or a historical version of the real participant (e.g., player's activity at a prior date/time). The processing device may generate the virtual participant by generating a graphical computer model, kinetic computer model, behavioral computer model, other computer model, or a combination thereof. The graphical computer model of the virtual participant may be generated based on image data of a deceased person, image data of a substitute person, or a combination thereof. The image data may include still image data (e.g., photographs) or video data (e.g., user generated video, TV program, or film). The kinetic computer model may be generated based on data of the deceased person and the data of the deceased person may include physiological data (e.g., height and a weight), performance data (e.g., measurement of one or more historical competitions), or a combination thereof.

Selecting the virtual participant may involve the processing device recommending one or more virtual participants (e.g., providing a recommendation). The recommending may involve comparing the participant data of the real participant with participant data of a set of one or more virtual participants. The participant data of the real or virtual participants may be generated by the processing device and may be based on physiological data and performance data. The physiological data may include a height, a weight, or a swing of the participant and the performance data may include a score of one or more historical competitions involving the participant. The processing device may select the virtual participant from the set of one or more virtual participants based on the comparing (e.g., one or more data comparisons).

At block 304, the processing device may receive video content comprising a real participant. The video content may be associated with a competition and may include one or more aspects of the competition. The video content may include one or more real participants (e.g., living golfers), portions of a competition area (e.g., $18^{th}$ hole of a golf course), other aspect of a competition, or a combination thereof. The video content may include image content (e.g., people, background, scenery), audio content (e.g., music, voices, sound effects), textual content (e.g., scores, participant statistics, rankings), other content, or a combination thereof. The processing device may also receive participant data of the real participant from a computing device in possession of the real participant. The computing device may include one or more sensors and may be the same or similar to a watch (e.g., smart watch), a mobile phone (e.g., smart phone), smart glasses (e.g., optical head mounted display), other device, or a combination thereof. In one example, the video content may include the real participant and a substitute participant (e.g., actor, body double). In another example, the video content may include the real participant and be absent a substitute participant.

At block 306, the processing device may simulate a competition that involves the virtual participant and the real participant. Simulating the competition may involve selecting actions to be performed by the virtual participant based on a behavioral computer model and determining results of the actions based on a kinetic computer model. Simulating the competition may also involve determining a competition area for the competition. The determination of the competition area (e.g., golf course) may be based on user input (e.g., user selection), participant data (e.g., GPS of real participant), a recommendation, or a combination thereof. Recommending a competition area may involve comparing performance data of the real and virtual participants and determining based on the comparing an advantage of the real participant over the virtual participant. The competition area (e.g., course, field, court) may then be selected or identified based on the advantage of the real participant (e.g., real person). In one example, the competition may be a sporting competition (e.g., golf) and the real participant may be a person (e.g., golfer) on a golf course. The simulation may include at least one image (e.g., frame) with both the real participant and the virtual participant on the golf course.

At block 308, the processing device may augment the video content to comprise an action performed by the virtual participant. Augmenting the video content may involve rendering a state of the virtual participant in view of one or more actions (e.g., activity, sequence of actions). The rendering may be based on the graphical computer model of the virtual participant and updating the video content may involve adding or modifying video content to represent the state of the virtual participant. The processing device may also provide for display the video content before, during, or after the augmenting. The video content may be displayed by a television, a personal computer, a phone, a head mounted display, or a combination thereof.

At block 310, the processing device may indicate a winner of the competition. Determining the winner of the competition may involve determining (e.g., calculating, computing) a first score for the virtual participant and a second score for the real participant. The processing device may compare the first score and the second score in view of one or more handicap score modifiers and determine the winner (e.g., identify, select, or choose the winner). Responsive to completing the operations described herein above with references to block 310, the method may terminate.

Figure 4:
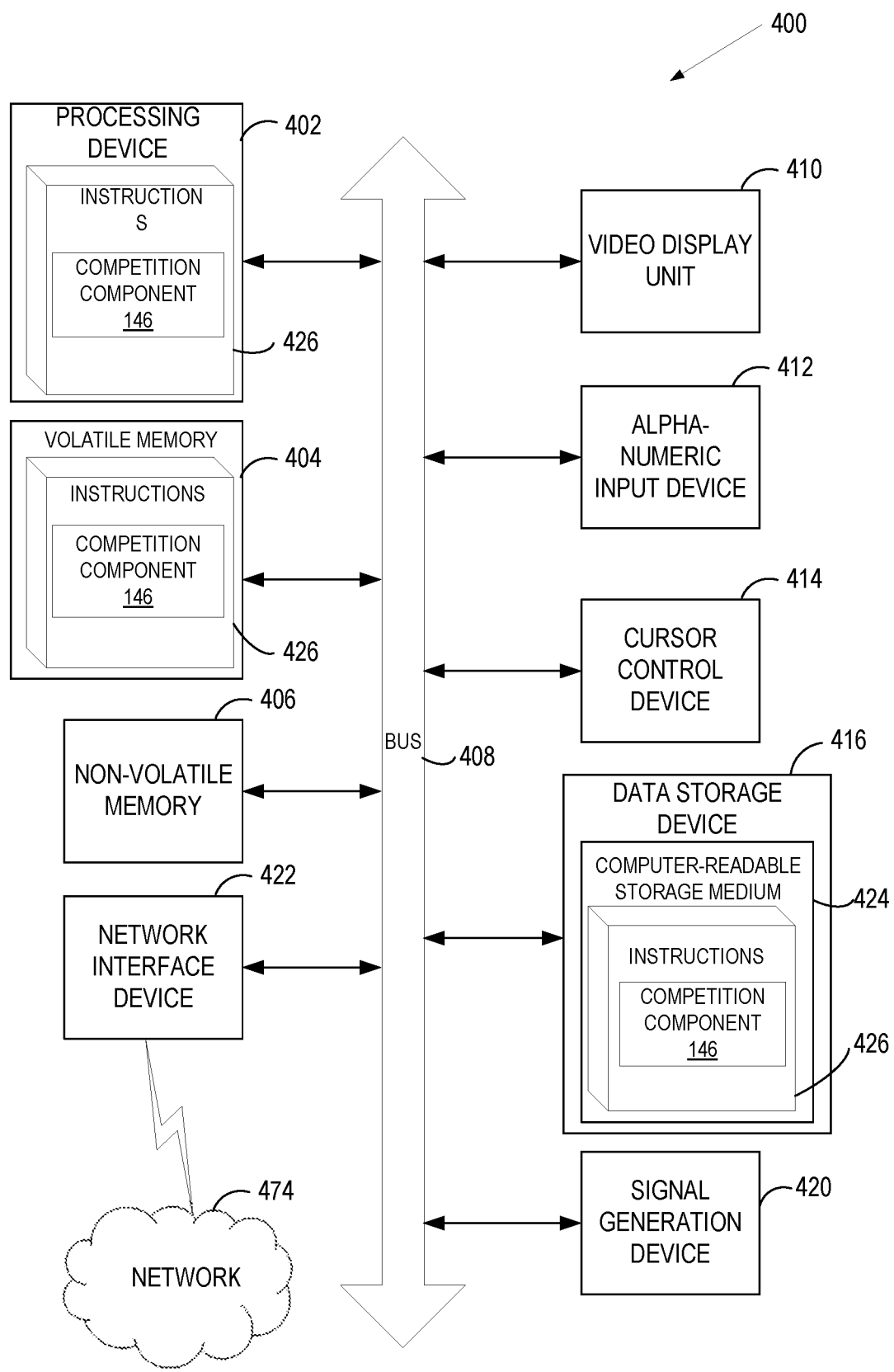
FIG. 4 is a block diagram illustrating example of a computer system in accordance with an implementation of the disclosure.

FIG. 4 depicts a block diagram of a computer system operating in accordance with one or more aspects of the present disclosure. In various illustrative examples, computer system 400 may correspond to computing devices 140A-C of FIG. 1 or computing device 140 of FIG. 2. In certain implementations, computer system 400 may be connected (e.g., via a network, such as a Local Area Network (LAN), an intranet, an extranet, or the Internet) to other computer systems. Computer system 400 may operate in the capacity of a server or a client computer in a client-server environment, or as a peer computer in a peer-to-peer or distributed network environment. Computer system 400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 400 may include a processing device 402, a volatile memory 404 (e.g., random access memory (RAM)), a non-volatile memory 406 (e.g., read-only memory (ROM) or electrically-erasable programmable ROM (EEPROM)), and a data storage device 416, which may communicate with each other via a bus 408.

Processing device 402 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 400 may further include a network interface device 422. Computer system 400 may also include a video display unit 410 (e.g., an LCD), an alphanumeric input device 412 (e.g., a keyboard), a cursor control device 414 (e.g., a mouse), and a signal generation device 420.

Data storage device 416 may include a non-transitory computer-readable storage medium 424 on which may store instructions 426 encoding any one or more of the methods or functions described herein, including instructions for implementing method 300 and for competition component 146 of FIGS. 1 and 2.

Instructions 426 may also reside, completely or partially, within volatile memory 404 and/or within the processing device 402 during execution thereof by computer system 400, hence, volatile memory 404, and processing device 402 may also constitute machine-readable storage media.

While computer-readable storage medium 424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer and cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware resources. Further, the methods, components, and features may be implemented in any combination of hardware resources and computer program components, or in computer programs.

Unless specifically stated otherwise, terms such as "selecting," "simulating," "augmenting," "indicating," "determining," "generating," "rendering," "updating," "comparing," "identifying," "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
generating, by a processing device, first participant data of a real participant, wherein the first participant data comprises at least one of a height, a weight, or performance data of the real participant;
generating second participant data of a virtual representation of a competitor, wherein the second participant data is based on historical performance data associated with one or more competitions involving the competitor;
generating a comparison of the first participant data and the second participant data;
identifying, based at least in part on a display of the comparison, a selection of the competitor from a set of competitors;
generating, based on the first participant data and the second participant data, a simulation of a competition involving the real participant and the virtual representation of the competitor; and
indicating a winner of the simulation of the competition.

2. The method of claim 1, further comprising:
generating one or more options associated with the competition based at least in part on the comparison.

3. The method of claim 1, further comprising processing video content comprising the real participant, wherein the simulation of the competition is based at least in part on the video content comprising the real participant.

4. The method of claim 1, further comprising publishing data associated with the simulation of the competition to a computing device.

5. The method of claim 1, further comprising augmenting video content associated with the simulation to comprise an action performed by the virtual representation of the competitor.

6. The method of claim 1, further comprising generating a recommendation relating to the set of competitors.

7. The method of claim 1, further comprising:
generating a first computer model of the virtual representation of the competitor based on image data of a person, wherein the image data comprises at least one of still image data or video data; and
generating a second computer model based on performance data associated with the person.

8. A system comprising:
a memory; and
a processing device communicably coupled to the memory, the processing device to perform operations comprising:
generating first participant data of a real participant, wherein the first participant data comprises at least one of a height, a weight, or performance data of the real participant;
generating second participant data of a virtual representation of a competitor, wherein the second participant data is based on historical performance data associated with one or more competitions involving the competitor;
generating a comparison of the first participant data and the second participant data;
identifying, based at least in part on a display of the comparison, a selection of the competitor from a set of competitors;
generating, based on the first participant data and the second participant data, a simulation of a competition involving the real participant and the virtual representation of the competitor; and
indicating a winner of the simulation of the competition.

9. The system of claim 8, the operations further comprising generating one or more options associated with the competition based at least in part on the comparison.

10. The system of claim 8, the operations further comprising processing video content comprising the real participant, wherein the simulation of the competition is based at least in part on the video content comprising the real participant.

11. The system of claim 8, the operations further comprising publishing data associated with the simulation of the competition to a computing device.

12. The system of claim 8, the operations further comprising augmenting video content associated with the simulation to comprise an action performed by the virtual representation of the competitor.

13. The system of claim 8, the operations further comprising generating a recommendation relating to the set of competitors.

14. The system of claim 8, the operations further comprising:
generating a first computer model of the virtual representation of the competitor based on image data of a person, wherein the image data comprises at least one of still image data or video data; and
generating a second computer model based on performance data associated with the person.

15. A non-transitory machine-readable storage medium storing instructions which, when executed, cause a processing device to perform operations comprising:
generating first participant data of a real participant, wherein the first participant data comprises at least one of a height, a weight, or performance data of the real participant;
generating second participant data of a virtual representation of a competitor, wherein the second participant data is based on historical performance data associated with one or more competitions involving the competitor;
generating a comparison of the first participant data and the second participant data;
identifying, based at least in part on a display of the comparison, a selection of the competitor from a set of competitors;
generating, based on the first participant data and the second participant data, a simulation of a competition involving the real participant and the virtual representation of the competitor; and
indicating a winner of the simulation of the competition.

16. The non-transitory machine-readable storage medium of claim 15, the operations further comprising generating one or more options associated with the competition based at least in part on the comparison.

17. The non-transitory machine-readable storage medium of claim 15, the operations further comprising processing video content comprising the real participant, wherein the simulation of the competition is based at least in part on the video content comprising the real participant.

18. The non-transitory machine-readable storage medium of claim 15, the operations further comprising publishing data associated with the simulation of the competition to a computing device.

19. The non-transitory machine-readable storage medium of claim 15, the operations further comprising augmenting video content associated with the simulation to comprise an action performed by the virtual representation of the competitor.

20. The non-transitory machine-readable storage medium of claim 15, the operations further comprising:
   generating a first computer model of the virtual representation of the competitor based on image data of a person, wherein the image data comprises at least one of still image data or video data; and
   generating a second computer model based on performance data associated with the person.

* * * * *